S. H. LIBBY.
GRAB BUCKET HOIST.
APPLICATION FILED SEPT. 21, 1910.
1,019,500.
Patented Mar. 5, 1912.
5 SHEETS—SHEET 1.
Fig. 1.
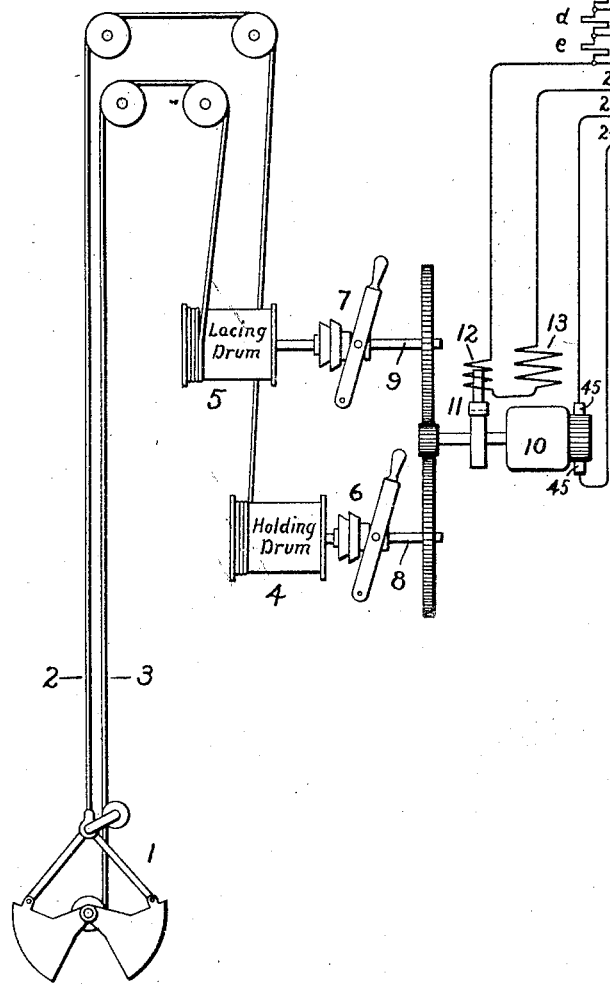
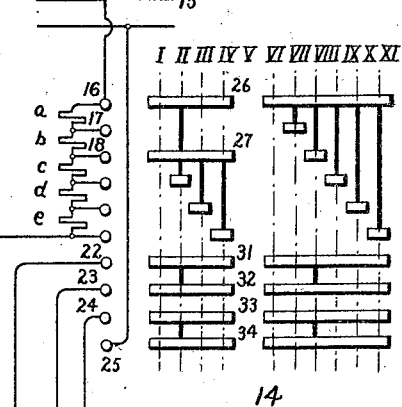
WITNESSES:
J. Earl Ryan
J. Ellis Glen
INVENTOR:
SAM H. LIBBY
BY
HIS ATTORNEY S. H. LIBBY.
GRAB BUCKET HOIST.
APPLICATION FILED SEPT. 21, 1910.
1,019,500.
Patented Mar. 5, 1912.
5 SHEETS—SHEET 4.
Fig. 4.
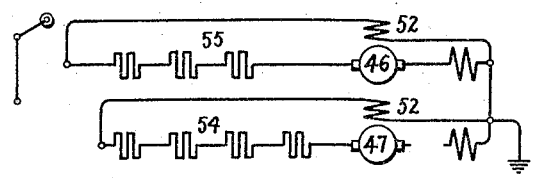 0
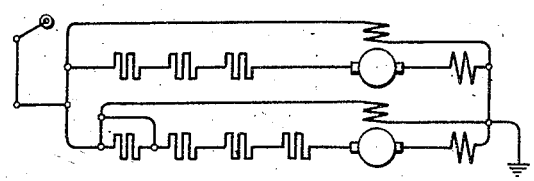 I
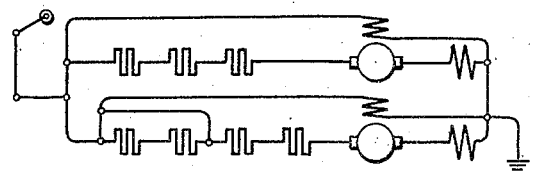 II
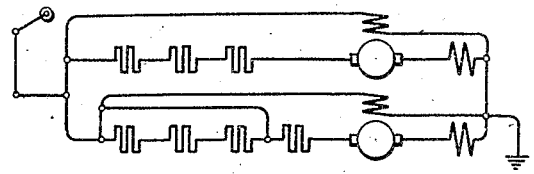 III
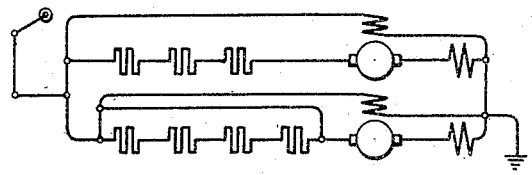 IV
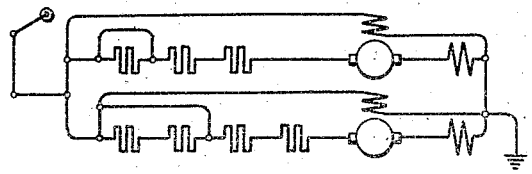 V
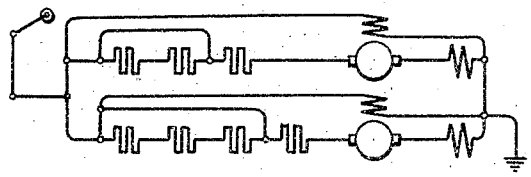 VI
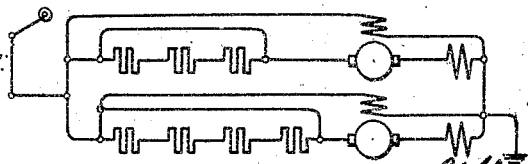 VII
WITNESSES
J. Earl Ryan
J. Ellis Glen
INVENTOR:
SAM H. LIBBY
BY
HIS ATTORNEY Fig. 5.
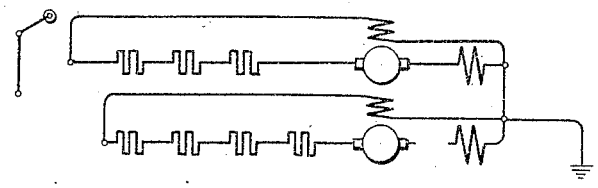
VIII
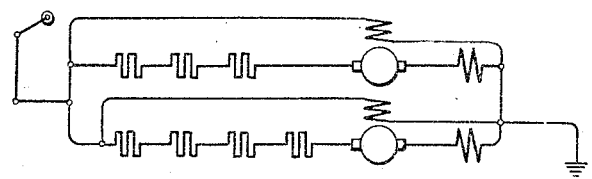
IX
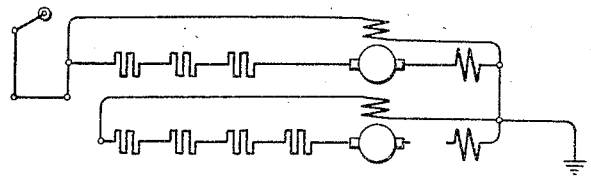
X
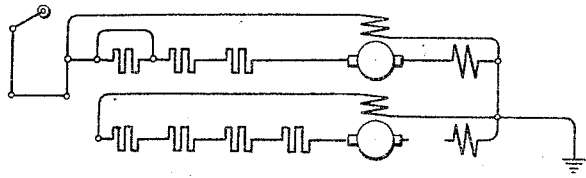
XI
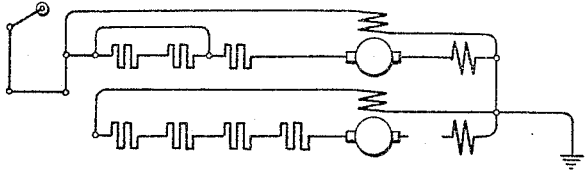
XII
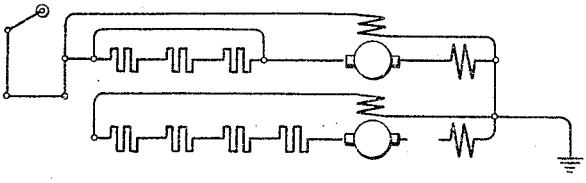
XIII

UNITED STATES PATENT OFFICE.

SAM H. LIBBY, OF BLOOMFIELD, NEW JERSEY, ASSIGNOR TO GENERAL ELECTRIC COMPANY, A CORPORATION OF NEW YORK.

GRAB-BUCKET HOIST.

1,019,500.  Specification of Letters Patent.  Patented Mar. 5, 1912.

Application filed September 21, 1910. Serial No. 583,029.

*To all whom it may concern:*

Be it known that I, SAM H. LIBBY, a citizen of the United States, residing at Bloomfield, county of Essex, State of New Jersey, have invented certain new and useful Improvements in Grab-Bucket Hoists, of which the following is a specification.

This invention relates to electric hoisting apparatus in which buckets of the clam shell or orange peel type are used to pick up and lift a load of loose material, and subsequently dump the same at some desired spot.

The object of the invention is to simplify the control apparatus and render the operation of the hoist convenient and reliable.

Hoists of this kind are provided with two ropes, one for closing and opening the jaws or valves of the bucket, commonly called the "lacing" rope, and the other for lifting and lowering the bucket, called the "holding" rope. In operating the hoist, the bucket, which may be assumed to be open and resting on the pile of material, is first closed by pulling up on the lacing rope. Both ropes are then wound up to lift the closed bucket and its contents. When it is desired to dump the bucket the lacing rope is slacked off a certain amount. To lower the bucket again, both ropes are paid out at the same rate.

My invention provides a simple arrangement of one or two electric motors, clutches, and a controller by means of which this cycle of operation can be easily effected, as hereinafter set forth and particularly pointed out in the claims.

Figure 2:
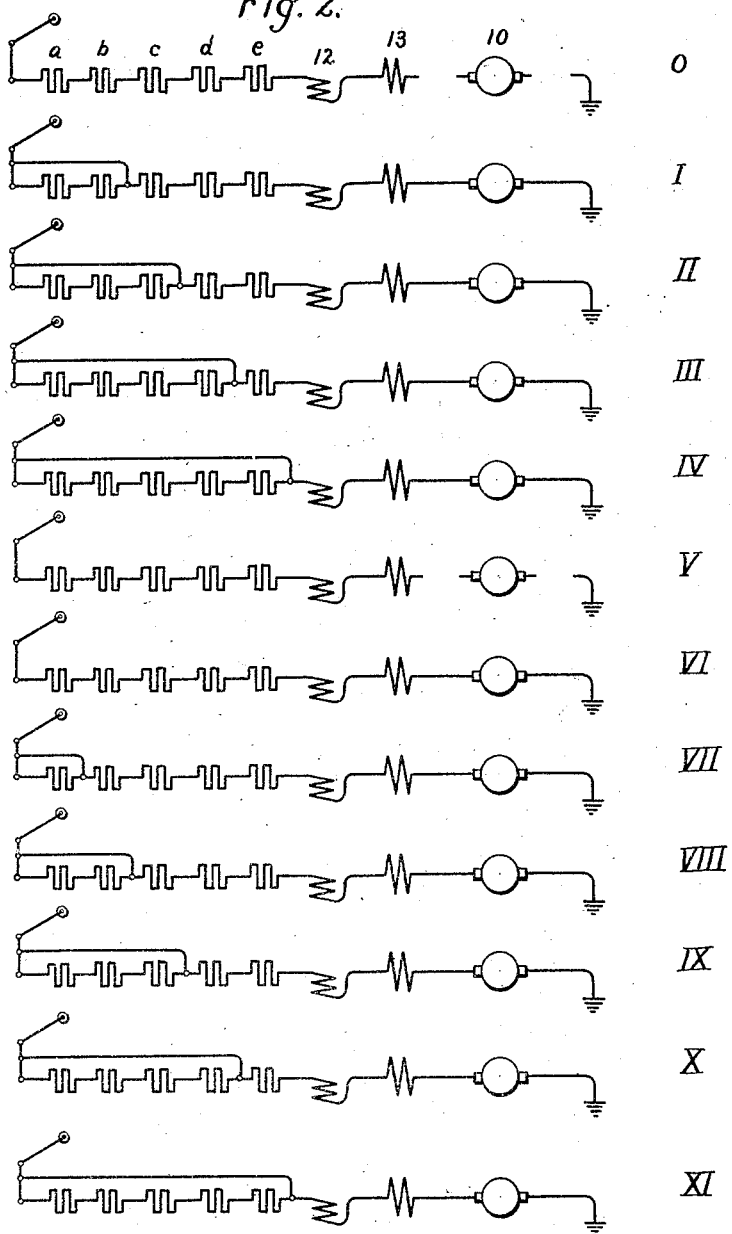
Figure 3:
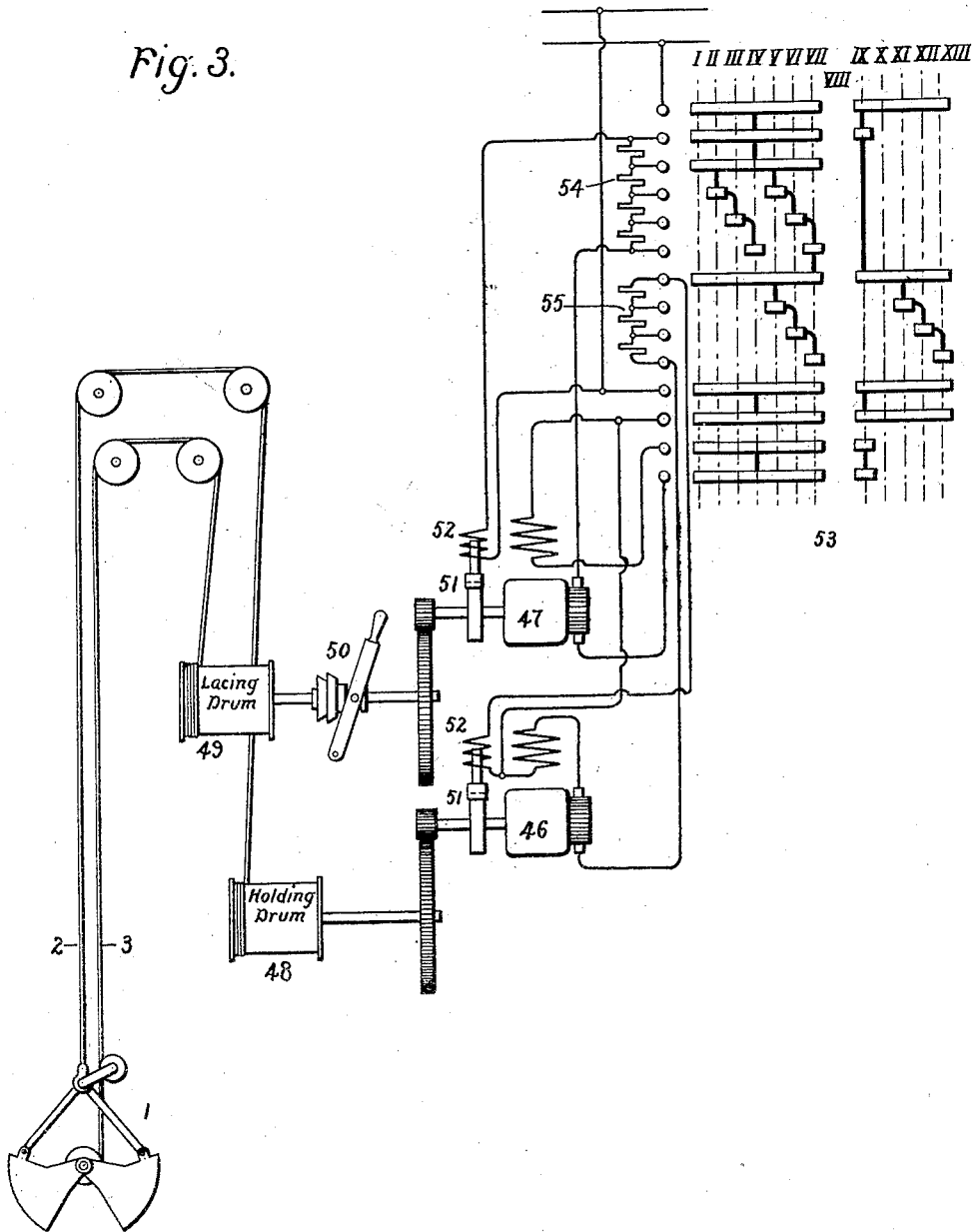

In the accompanying drawings, Figure 1 is a diagrammatic representation of a grab bucket, two hoisting drums, a single motor geared thereto, and a controller for said motor; Fig. 2 is a series of diagrams of the circuits of said motor as varied by the operation of said controller; Fig. 3 shows diagrammatically an arrangement employing two motors; Fig. 4 is a series of diagrams showing some of the circuit changes in this arrangement, and Fig. 5 is a continuation of Fig. 4.

Referring first to Figs. 1 and 2, the grab bucket 1 of the clam shell type is provided with a holding rope 2 and a lacing rope 3, running respectively to drums 4 5 both of the same size, which can be connected by the manually-operated clutches 6 7 with the shafts 8 9 suitably geared to the single electric motor 10, in such a manner that both drums will run at the same speed. An electromagnetic brake 11 is applied to the shaft of the motor, its releasing coil 12 being in series with the field coil 13 of the motor, which is of the usual series type. The controller 14 has ten running positions and an "off" position. In the position shown in Fig. 1 and in the diagram Fig. 2—O, the field coil and armature are open-circuited. The bucket is open and resting on the pile of material to be hoisted. The operator now moves his controller to position 1 and closes the lacing clutch 7. The motor circuits, as shown in Fig. 2—I, may be traced from the line 15 through finger 16, contact segments 26, 27, finger 18, resistance coils $c\ d\ e$, brake coil 12, field coil 13, finger 22, contacts 31, 32, finger 23, armature brushes 45, finger 24, contacts 33, 34, and finger 25 to the other side of the line. The controller is quickly turned through the next three positions II, III, IV, in order to cut out all the resistance and accelerate the motor to full speed. The instant the jaws of the bucket have been closed by the winding up of the lacing rope, the holding clutch 6 is closed and both ropes are wound up at full speed, hoisting the closed bucket. When it is at the required height, the controller is then turned to position V, open-circuiting the motor again and letting the brake go on to hold the load suspended. To dump it, the lacing clutch 7 is opened, slacking off the lacing rope and permitting the bucket to open. To lower either the load or the empty bucket, the lacing clutch is closed and the controller is turned to the lowering position VI which cuts all the resistance into the motor circuit and reduces the current to such an extent that the weight of the full or empty bucket will overhaul the motor through the pull of the holding rope on its drum. The lacing drum, being geared to the motor shaft, will pay out the lacing rope at the same speed as the holding rope, so that it cannot become too slack, nor on the other hand will it close the bucket if empty. The several lowering positions from VI to XI enable the motor to be lowered at any desired speed by varying the resistance in circuit. It will be observed that the first hoisting position (I) has less resistance in circuit than the first lowering position (VI). Consequently, this difference in resistance can be adjusted to suit the conditions, so that a load which would be picked up on the first hoisting position might be lowered on the first lowering position, or possibly on the second lowering position. If the load gets to dropping too rapidly, the resistance would be cut out until the right speed has been obtained, at which times some of the points after the second lowering position would quite likely be used.

In Figs. 3, 4 and 5, I have shown a modification in which two separate motors 46, 47 are used, geared respectively to the holding drum 48 and the lacing drum 49 in such manner that both drums rotate at the same speed. The lacing drum is loose on its shaft and can be coupled thereto by a manual clutch 50, but the holding drum is keyed fast on its shaft so as to rotate whenever its motor runs. Each motor has a brake 51 with a releasing magnet coil 52. The motors are series wound, and are both controlled by one controller 53, which has seven hoisting positions (I to VII) and six lowering positions (IX to XIII), with an intermediate "off" position (VIII). Assume that the bucket is open and is resting on the pile of material to be hoisted: The operator closes the lacing clutch and moves the controller to positions I, II, III, IV, which produce the connections shown in Fig. 4—I, II, III, IV, gradually cutting out the resistance coils 54. The lacing motor runs up to full speed and closes the bucket upon its load. The resistance 55 in the circuit of the holding motor permits it to exert only sufficient torque to keep the holding rope taut without lifting the bucket out of the material. To hoist, the controller is turned, first to position V, which throws equal resistance upon both motor circuits, cutting out a part of that formerly in the holding motor circuit, and allowing said motor to lift the load. Positions VI and VII cut out all the resistance from both motor circuits and run the motors up to full speed to hoist the load. When lifted high enough the controller is turned another notch to VIII, which open-circuits both motors and deënergizes the releasing magnets, so that the brakes can sustain the load. The next position, IX, cuts in both motors with all of both resistances 54, 55 in circuit. This weakens their torque to such an extent that the load will overhaul them, turning their armatures backward and permitting the closed bucket to be lowered. The next step, X, open-circuits the lacing motor and leaves the lowering of the bucket to be handled by the holding motor whose speed of overhauling can be regulated by cutting out more or less of its resistance 55, as provided for in steps XI, XII, XIII. The bucket must be dumped before this by pulling open the clutch 50 of the lacing drum, because when the lacing motor is open-circuited it becomes locked by its brake. In lowering after opening said clutch, the lacing drum is easily overhauled by the lacing rope without danger of closing the bucket, but as soon as the bucket reaches the pile of material and the holding motor is stopped the lacing clutch should be closed to stop the drum and prevent the unreeling of too much rope.

In accordance with the provisions of the patent statutes, I have described the principle of operation of my invention, together with the apparatus which I now consider to represent the best embodiment thereof; but I desire to have it understood that the apparatus shown is only illustrative, and that the invention can be carried out by other means.

What I claim as new and desire to secure by Letters Patent of the United States, is,—

1. In a grab bucket hoist, the combination with the bucket and the holding and lacing ropes, of a separate drum for each rope, a clutch for the lacing drum, a separate series wound electric motor geared to each drum, and a controller comprising suitable segments, fingers and resistances and adapted in its various positions to operate first the lacing motor, then both motors at the same speed for hoisting, and then throwing increased resistance into both motor circuits for lowering the bucket closed by overhauling both of said motors.

2. In a grab bucket hoist, the combination with the bucket and the holding and lacing ropes, of a separate drum for each rope, a clutch for the lacing drum, a separate series wound electric motor geared to each drum, and a controller comprising suitable segments, fingers and resistances and adapted in its various positions to operate first the lacing motor, then both motors at the same speed for hoisting, then throwing increased resistance into both motor circuits for lowering the bucket closed by overhauling both of said motors, and finally open-circuiting the lacing motor and lowering by control of resistance in the circuit of the holding motor.

In witness whereof, I have hereunto set my hand this 15th day of September, 1910.

SAM H. LIBBY.

Witnesses:
ROGER H. BUTTERWORTH,
ANNA S. MCMANUS.